(12) United States Patent
Hugg (10) Patent No.: US 6,939,095 B1
(45) Date of Patent: Sep. 6, 2005

(54) SELECTIVELY REMOVABLE TIE-DOWN ANCHOR

(76) Inventor: Richard C. Hugg, 3775 "O" Ave., Westside, IA (US) 51467

( * ) Notice: Subject to any disclaimer, the term of this patent is extended or adjusted under 35 U.S.C. 154(b) by 0 days.

(21) Appl. No.: 10/777,951

(22) Filed: Feb. 12, 2004

(51) Int. Cl.[7] .................................................. B60P 7/08
(52) U.S. Cl. ...................... 410/102; 410/100; 410/103; 410/106; 410/110; 410/116
(58) Field of Search ........................... 410/12, 97, 100, 410/102–103, 106, 110, 116; 254/329, 352; 248/499; 24/265 CD, 68 CD, 68 CT (56) References Cited

U.S. PATENT DOCUMENTS

| | | | | |
|---|---|---|---|---|
| 5,388,938 A | * | 2/1995 | Helton | .................. 410/101 |
| 5,538,376 A | * | 7/1996 | Borda | ......................... 410/99 |
| 5,860,777 A | * | 1/1999 | Walsh et al. | .................. 410/100 |
| 6,109,844 A | * | 8/2000 | Nadherny et al. | ............. 410/34 |
| 6,250,861 B1 | * | 6/2001 | Whitehead | .................. 410/100 |
| 6,626,621 B1 | | 9/2003 | Hugg | ......................... 410/103 |

* cited by examiner

*Primary Examiner*—Stephen Gordon
(74) *Attorney, Agent, or Firm*—Thomte, Mazour & Niebergall; Dennis L. Thomte (57) ABSTRACT

A tie-down strap or chain anchor is described for use with a trailer or truck. The anchor includes a stem portion which is adapted to be secured to one side of the bed of the trailer or truck. A pair of spaced-apart plates are secured to the upper end of the stem portion and have a J-shaped receiver secured thereto and extending therebetween which includes an inclined portion and a generally U-shaped portion at the lower end thereof. The U-shaped portion has a slot or notch formed therein.

14 Claims, 8 Drawing Sheets

SELECTIVELY REMOVABLE TIE-DOWN ANCHOR

BACKGROUND OF THE INVENTION

1. Field of the Invention

This invention relates to a selectively removable tie-down anchor for a tie-down strap or tie-down chain. More particularly, this invention relates to a selectively removable tie-down anchor for a flatbed trailer which may be selectively positioned at any place along substantially the entire length of a flatbed trailer or the like.

2. Description of the Related Art

Tie-down devices have been used for many years for tying down cargo resting on the bed of flatbed trailers, stepdeck trailers and straight trucks. As used herein, the word "vehicle" will include all types of trailers and trucks wherein cargo is secured to the beds thereof. Prior to applicant's invention of U.S. Pat. No. 6,626,621, the known tie-down devices included a plurality of winches which were each selectively longitudinally movable on a shaft positioned at one side of the trailer bed. One end of a strap was inserted into a winch and passed over the cargo with the other end of the strap normally being secured to the other side of the trailer. If the winch supporting shafts of the prior art extended the entire length of the trailer, they would serve their purpose. However, in some types of trailers, it was not possible to run the winch supporting shaft the entire length of the trailer beds due to wheels, toolboxes positioned between wheels, etc. Therefore, prior to applicant's invention of U.S. Pat. No. 6,626,621, in certain trailer configurations, it was impossible to use a tie-down strap winch for several feet along the length of the trailer.

U.S. Pat. No. 6,262,621 discloses a selectively removable tie-down strap winch assembly for a trailer or truck which is believed to represent a significant advance in the art. Even though the tie-down strap winch assembly of applicant's U.S. Pat. No. 6,626,621 works exceptionally well, it is still necessary to anchor or secure the other end of the strap to the other side of the trailer. Additionally, when tie-down chains are utilized, it is necessary to secure the opposite ends of the chains to opposite sides of the trailer. Heretofore, it is believed that the prior art has not provided a convenient way of securing the tie-down straps and tie-down anchors to the trailer.

SUMMARY OF THE INVENTION

A selectively removable tie-down anchor is provided for securing one end of a tie-down strap or tie-down chain to the trailer bed. The tie-down anchor of this invention is ideally suited for use with winch assemblies such as disclosed in applicant's U.S. Pat. No. 6,626,621. Assuming that a tie-down strap is being used with a winch assembly for tightening the same, the winch assembly is positioned at one side of the cargo supporting bed with the anchor assembly of this invention secured to the other side of the cargo supporting bed. The anchor assembly includes a substantially vertically disposed stem portion which has a hook member movably mounted thereon which is adapted to selectively releasably engage the lower end of one of the side walls at the other side of the bed when the stem portion of the anchor assembly is inserted downwardly into one of the pocket areas at the other side of the bed. The anchor assembly includes a pair of upstanding, horizontally spaced-apart plates mounted on the upper end of the stem portion with a strap or chain receiver mounted on and extending between the pair of plates. The receiver on the anchor assembly is generally J-shaped including a first tie-down portion having upper and lower ends secured to and extending between the spaced-apart plates and a generally U-shaped tie-down portion at the lower end of the first tie-down portion. The U-shaped tie-down portion has a notch formed therein. If one end of the tie-down strap has a J-shaped or U-shaped hook thereon, the hook on the strap is placed over the upper end of the first tie-down portion with the strap extending therefrom beneath the receiver and thence over the receiver towards the other side of the trailer. If the anchor is being used to secure one end of a tie-down chain, the chain may be looped around the receiver with the hook of the chain being secured to one of the links of the chain. The chain may also be secured to the anchor by inserting one of the links thereof in the notch formed in the receiver with the hook of the chain being positioned above the J-shaped second tie-down portion of the anchor.

It is therefore a principal object of the invention to provide a selectively removable tie-down strap anchor which may be used with either a tie-down strap or a tie-down chain.

A further object of the invention is to provide an invention of the type described which may be removably positioned in pocket areas along substantially the entire length of the trailer bed.

Still another object of the invention is to provide a device of the type described wherein the device includes a spring-loaded hook member which may engage the lower end of a side rail, the lower end of a stand-off plate, or the lower end of the side of the trailer.

Yet another object of the invention is to provide a selectively removable tie-down anchor for a trailer which may be inserted between the side rail and the side of the trailer bed or into a stake pocket.

These and other objects will be apparent to those skilled in the art.

DESCRIPTION OF THE PREFERRED EMBODIMENT

Figure 2:
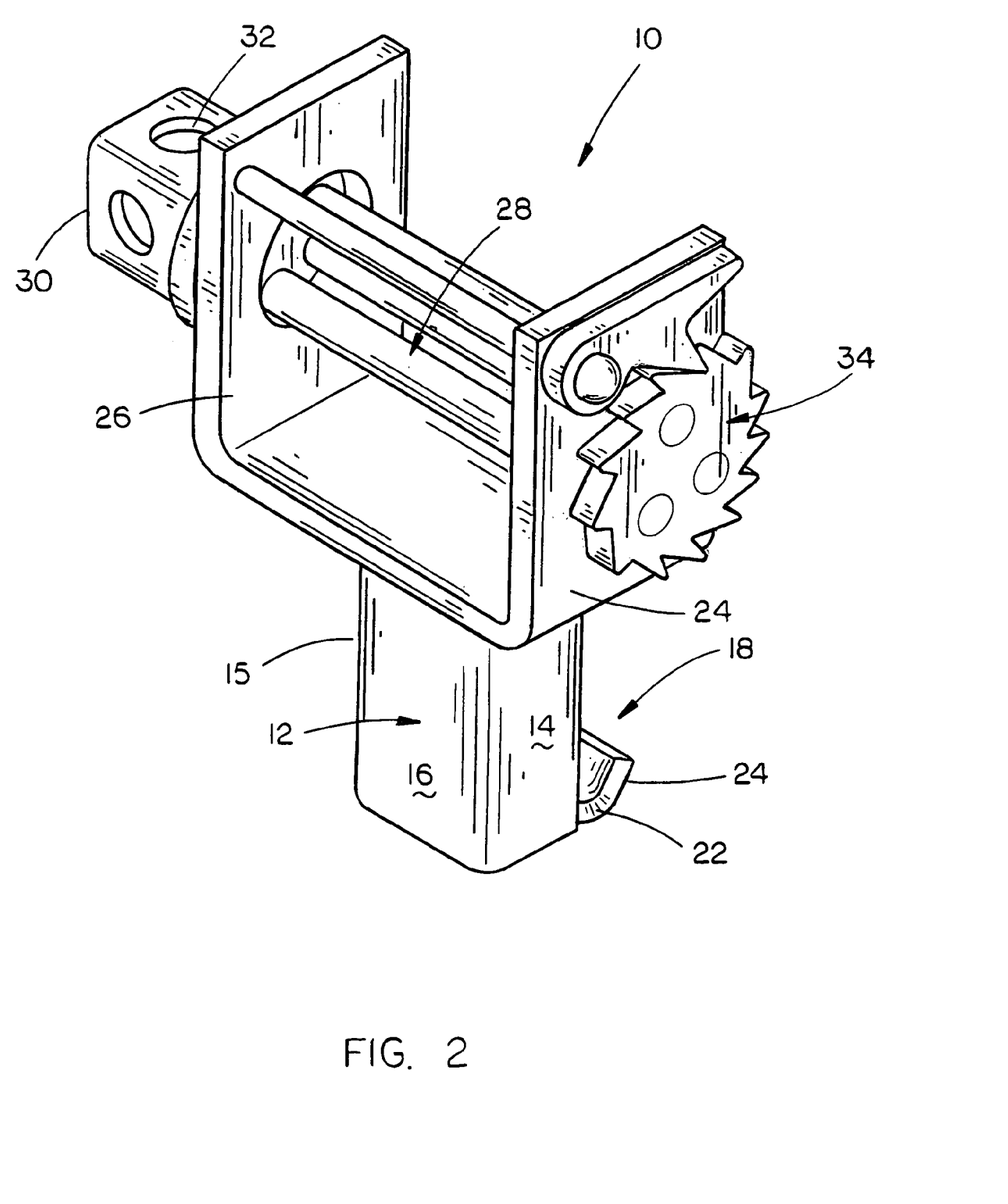
FIG. 2 is a perspective view of the winch assembly of the '621 patent.
Figure 3:
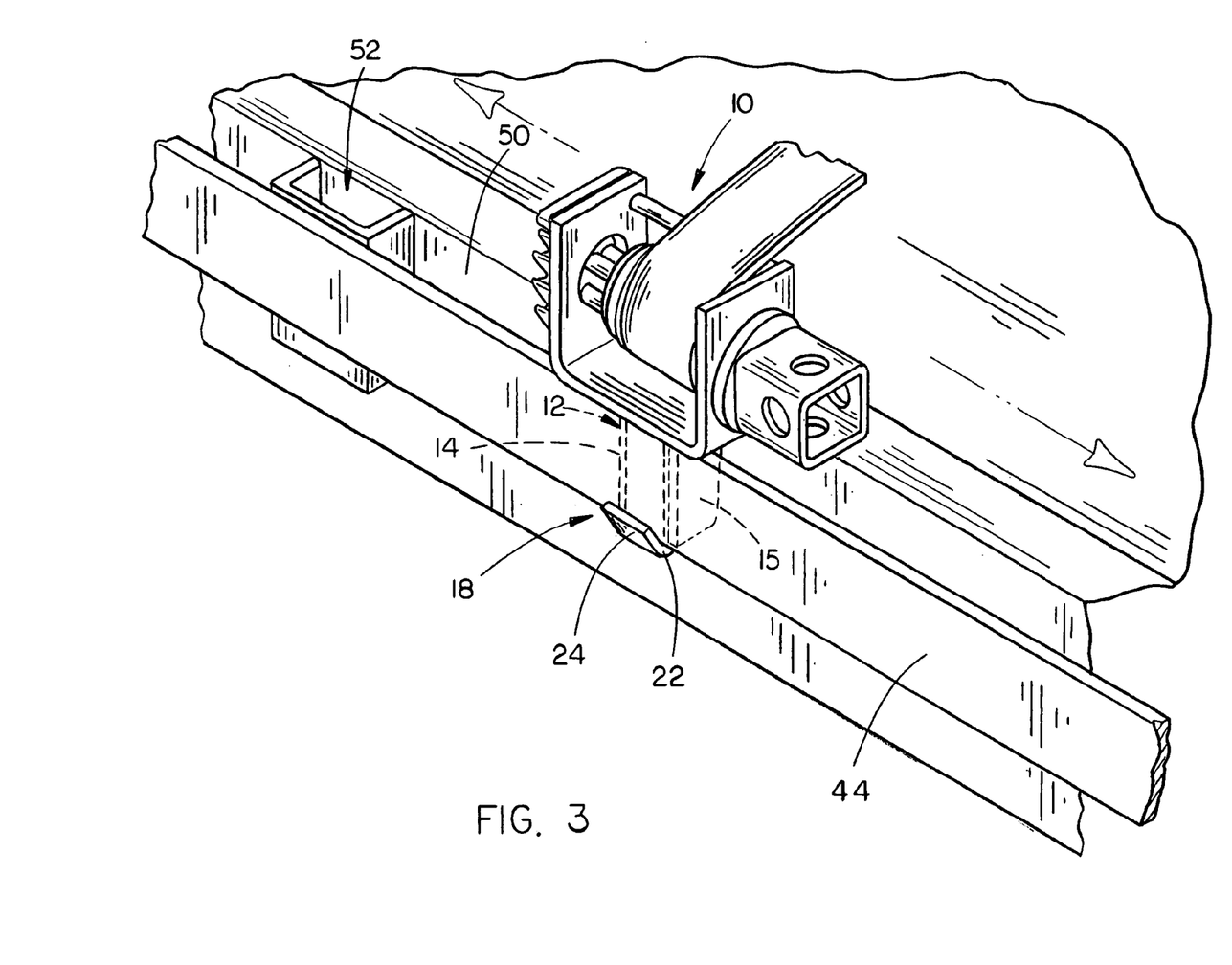
FIG. 3 is a perspective view of the winch assembly of the '621 patent mounted between one side of the trailer and a side rail.

The numeral 10 refers generally to a generally Y-shaped winch assembly as described in U.S. Pat. No. 6,626,621. Winch assembly 10 includes a stem or post portion 12 which is channel-shaped or C-shaped and which includes sides 14 and 15 and back wall 16. In one embodiment, the stem portion 12 is positioned so that the "opening" of the stem portion 12 faces laterally outwardly, as seen in FIGS. 2, 3 and 4B. A hook member 18 is pivotally mounted between the sides 14 and 15 and is movable between latched and unlatched positions, as seen in the drawings. A spring 20 urges hook member 18 to its latched position. Hook member 18 could also be urged to the latched position by a counterweight assembly. The lower end of the hook member 18 includes a hook portion 22 having an upwardly and outwardly extending portion 24.

A pair of upstanding and horizontally spaced-apart plates 25 and 26 are secured to the upper end of stem portion 12 and have a strap receiver or drum mechanism 28 rotatably mounted therein and extending therebetween. A tubular member 30 is secured to one end of the strap receiver mechanism 28 and includes registering openings 32 formed therein adapted to receive one end of a pry bar or the like therein. The other end of the strap receiver mechanism 28 is provided with a conventional winch ratchet assembly 34.

Figure 1:
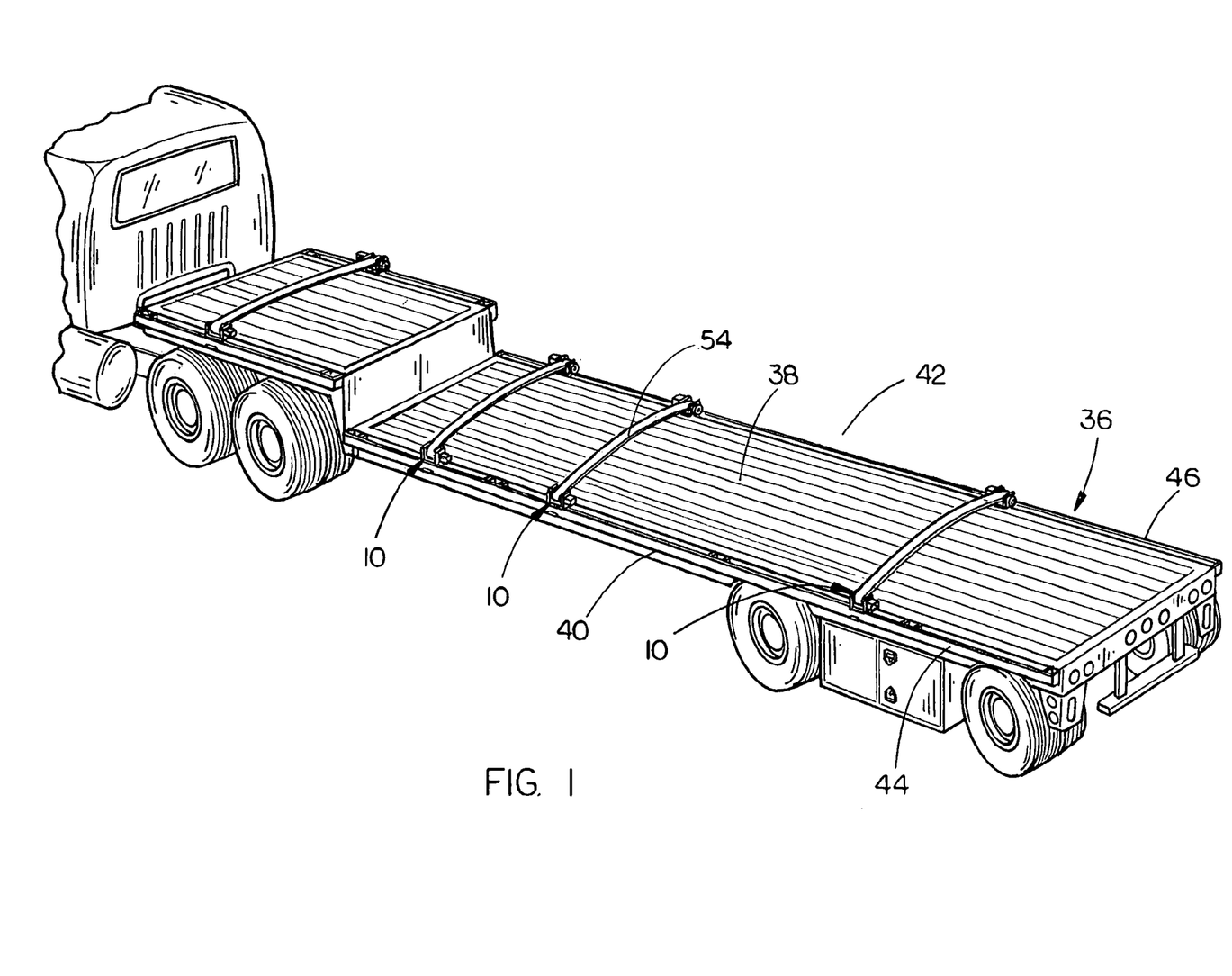
FIG. 1 is a rear perspective view of a trailer having a plurality of winch assemblies such as shown in U.S. Pat. No. 6,626,621 mounted thereon.

The winch assembly 10 of the '621 patent is designed to be used with a stepdeck or flatbed trailer of the type such as illustrated in the drawings and generally referred to by the reference numeral 36. The winch assembly 10 could also be used to secure cargo on the bed of a straight truck. Trailer 36 includes a bed portion 38 having opposite sides or side areas 40 and 42 having upper and lower ends. Side rails 44 and 46 are positioned outwardly of the side areas 40 and 42, respectively, by conventional stand-offs which define pocket areas 50 between the side areas 40 and 42 and the side rails 44 and 46. Some trailers are also provided with stake pockets 52.

When it is desired to utilize a tie-down strap to secure cargo on the bed of the trailer, the winch assembly 10 is properly positioned with respect to the cargo and the stem portion 12 is inserted downwardly into one of the pocket areas 50 so that the hook portion 22 faces outwardly (FIG. 3). As the stem portion 12 is being inserted downwardly into the pocket area 50, the portion 24 of hook member 18 engages the respective side rail (44) to move the hook member 18 from its normally latched position to its unlatched position. Once the hook portion 22 is below the lower end of the side rail, the hook member 18 moves outwardly, due to the spring 20 acting upon hook member 18, to engage the lower end of the side rail to anchor the winch assembly 10 in position with respect thereto (FIG. 3).

One end of a tie-down strap 54 is secured to side area 42 of trailer 36 as will be described hereinafter. The strap 54 is extended over the cargo to be tied down and the other end of the strap 54 is inserted into strap receiver mechanism 28 between the rods 56 thereof. The tubular member 30 is then rotated through the use of a pry bar or the like to cause the strap 54 to be wound upon the strap receiver mechanism 28 until the cargo is securely tied down with the winch ratchet assembly 34 preventing unwinding rotational movement of the strap receiver mechanism 28 in conventional fashion.

Figure 4A:
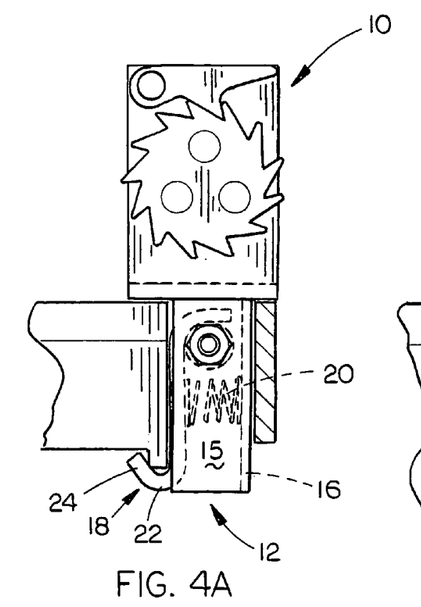
FIG. 4A is a side elevational view illustrating the hook member of the invention of the '621 patent having been rotated 180° from the position of FIG. 3.
Figure 4B:
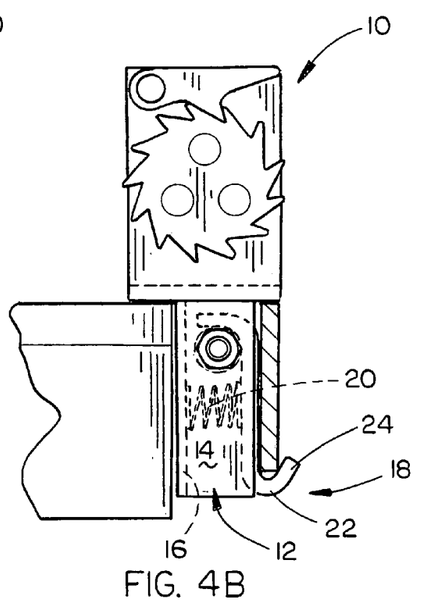
FIG. 4B is a side elevational view of the embodiment of FIG. 3.
Figure 4C:
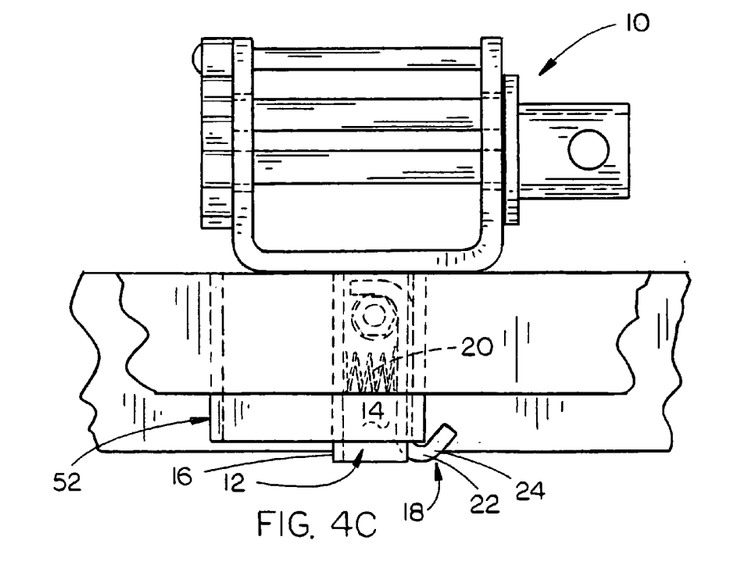
FIG. 4C is a front elevational view of a further embodiment of the invention and which shows the invention of the '621 patent inserted into a stake pocket.

In some trailer configurations, it may be desirable to secure the hook portion 22 of hook member 18 to the lower end of the side area of the trailer, as seen in FIG. 4A. In that case, the stem portion 12 would probably have to be lengthened and the channel-shaped stem portion 12 would be rotated 180° with respect to the plates 25 and 26. Further, the hook member 18 could be rotated 90° from the position illustrated in FIG. 4 to the position of FIG. 4C so that the hook portion 22 of hook member 18 engages the lower end of one of the plates of the stake pockets 52.

Figure 5:
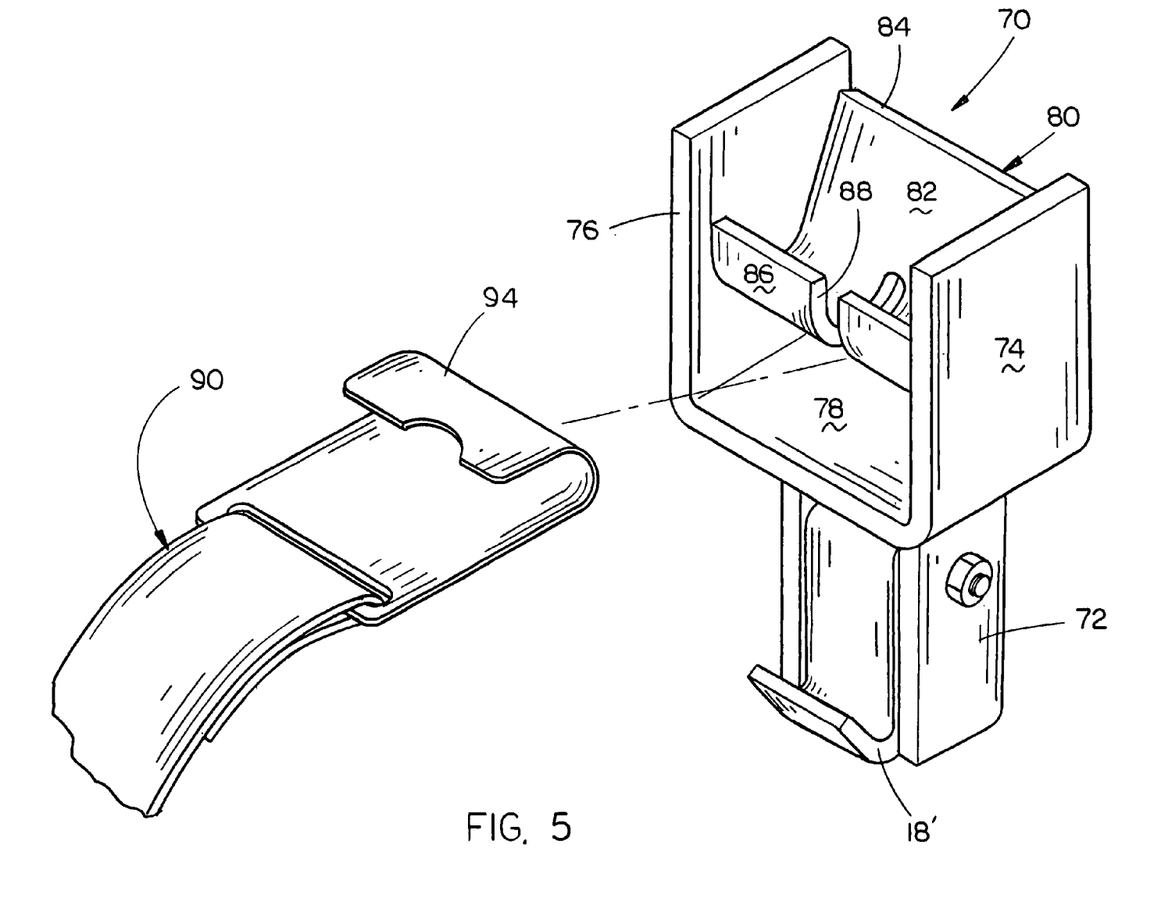
FIG. 5 is a perspective view of the tie-down anchor of this invention.

The numeral 70 refers to the selectively removable tie-down anchor of this invention which is ideally suited for use with the Y-shaped winch assembly of the '621 patent or any other type of winch assembly utilized with tie-down straps. The tie-down anchor 70 of this invention may be used also to anchor one end of a tie-down chain or strap.

Anchor 70 includes a stem or post portion 72 which is identical to stem or post portion 12 of the winch assembly 10 and which may be removably secured to one side of the trailer or vehicle bed in the same manner as stem portion 12, as described hereinabove. Stem portion 72 includes a spring-loaded hook member 18' identical to hook member 18 in U.S. Pat. No. 6,626,621. A pair of spaced-apart upstanding plates 74 and 76 extend upwardly from base 78 which is welded to the upper end of stem portion 72. The numeral 80 refers to a generally J-shaped strap or chain tie-down receiver which is welded to plates 74 and 76 and which includes an inclined first receiver portion 82 having an upper end 84. Receiver 82 also includes a second receiver portion 86 at the lower end of first receiver portion 82 which is generally U-shaped. Receiver portion 86 is provided with a notch or slot 88 formed therein.

Figure 6:
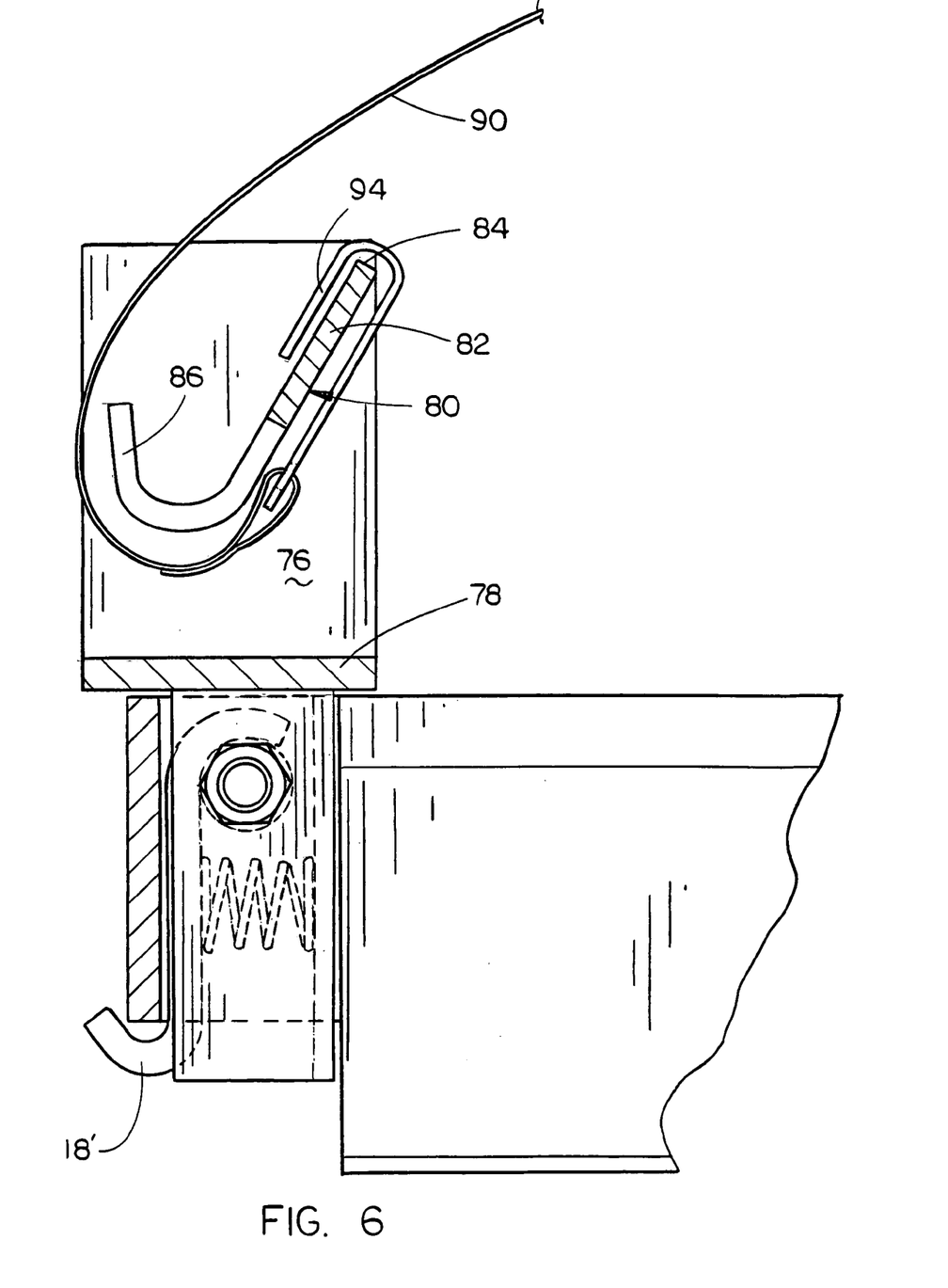
FIG. 6 is a partial sectional view of the anchor of this invention.

The anchor 70 may be used to anchor one end of a strap 90 or a chain 92. Strap 90 normally has a J-shaped hook 94 at one end thereof. Chain 92 has a hook 96 which is connected to the end-most chain link 98 in conventional fashion. When the anchor is to be used to anchor one end of a strap 90, the stem portion 72 is mounted on the trailer in the same manner as stem portion 12 of the winch assembly 10 is mounted. The end of the strap 90 is inserted between the plates 74 and 76 beneath receiver portion 86 (FIG. 5) and the hook 94 is positioned on the upper end 84 of receiver portion 82, as illustrated in FIG. 6. The strap 90 is then extended around receiver portion 86 and over the upper end 84 of receiver portion 82, over the cargo, to the winch assembly at the other side of the bed, as seen in FIG. 6. If the strap 90 should become slightly loosened during use, the hook 94 will tend to remain connected to the upper end 84 of receiver portion 72 rather than becoming disconnected therefrom as often occurs in the prior art.

Figure 7:
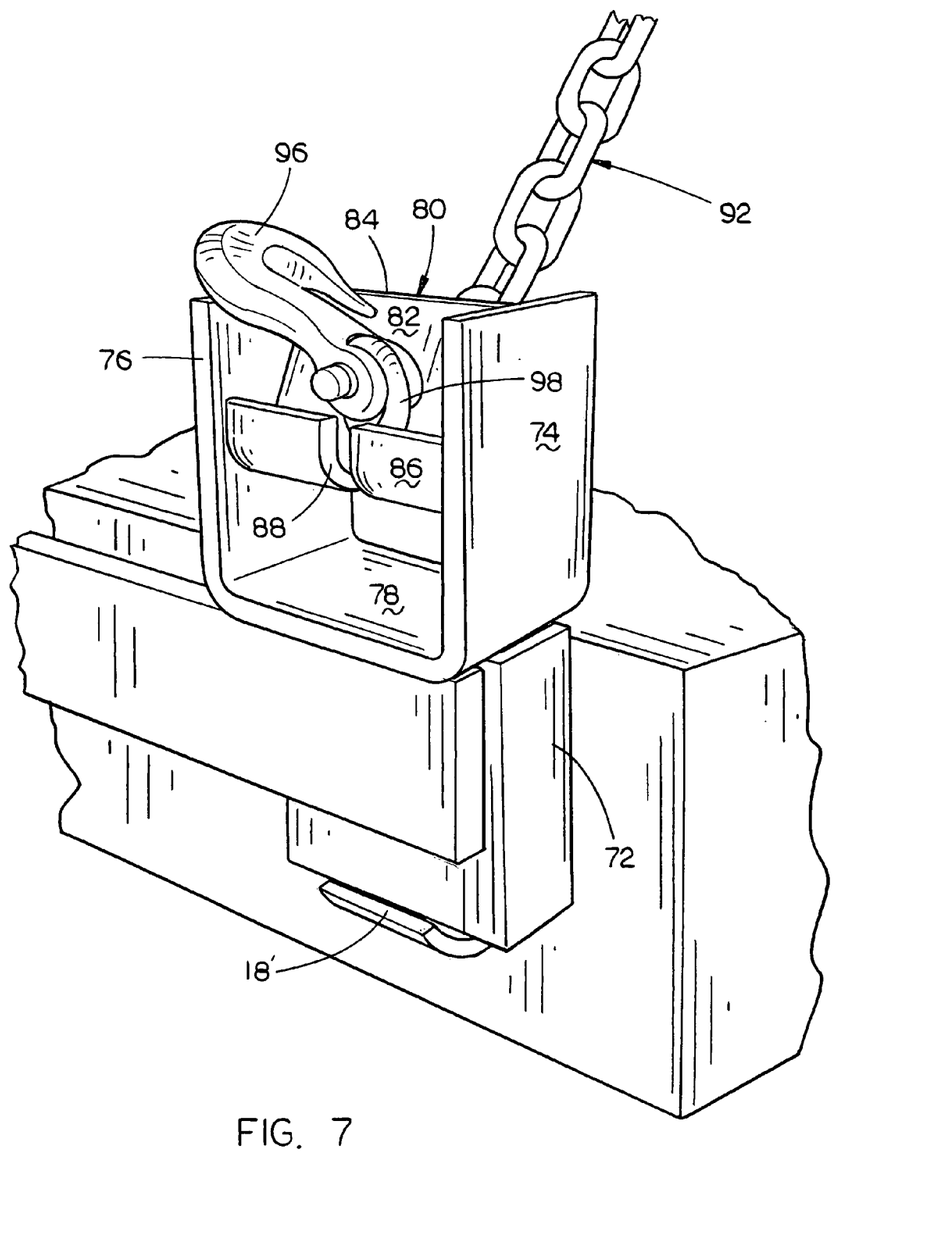
FIG. 7 is a perspective view illustrating a tie-down chain secured to the tie-down anchor.
Figure 8:
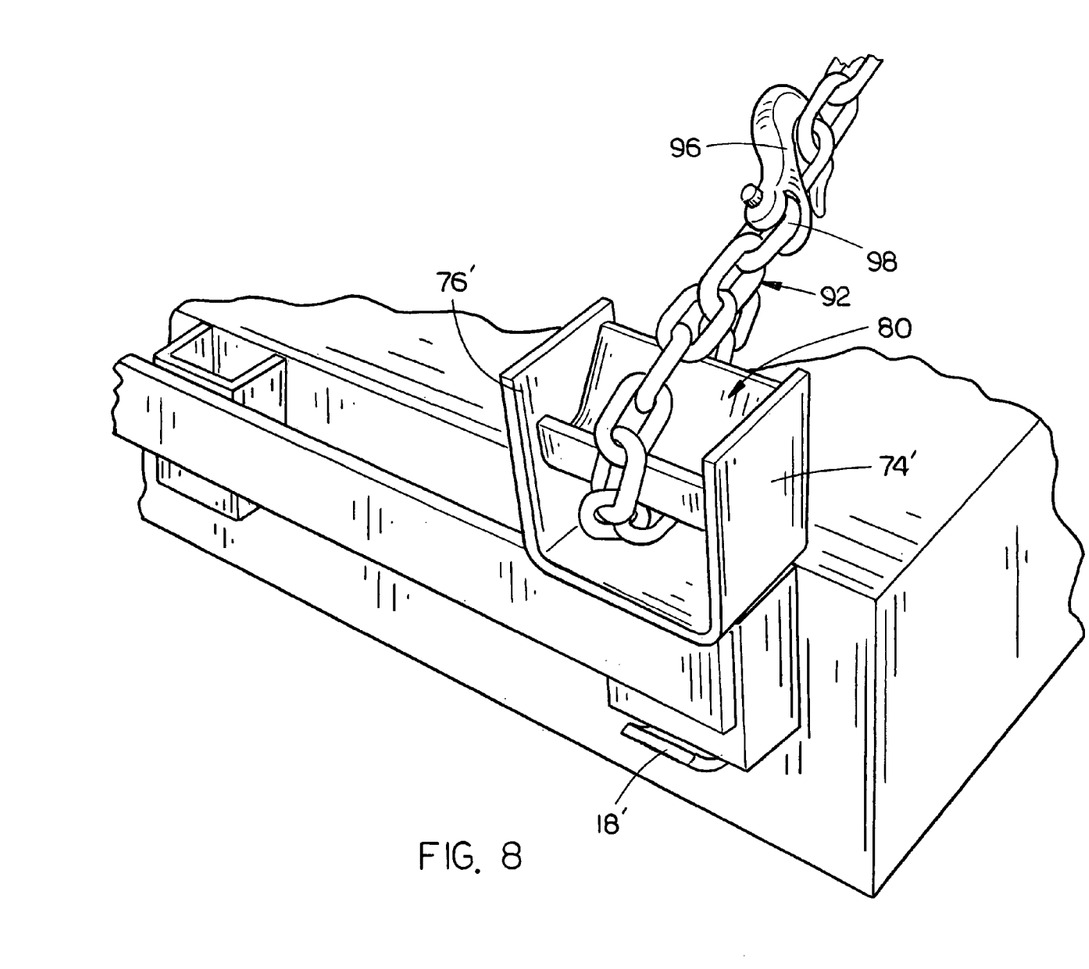
FIG. 8 is a view similar to FIG. 7 except that the tie-down chain is secured to the anchor in a different manner than that shown in FIG. 7.

If anchor 70 is going to be used to anchor one end of a chain 92, the chain 92 may be connected thereto in one of two ways. First, the chain 92 may be wrapped around the receiver 80, as illustrated in FIG. 8, with the hook 96 being secured to one of the links 98. Secondly, the chain 92 may be secured to the anchor 70 by positioning one of the links 98 within the notch or slot 88, as illustrated in FIG. 7. The engagement of the link 98 with the receiver portion 86 on opposite sides of notch or slot 88 prevents the chain 92 from disconnecting from the anchor 70.

Thus it can be seen that a unique tie-down anchor has been provided which enables either a tie-down strap or chain to be secured thereto in a quick and efficient manner.

Thus it can be seen that the invention accomplishes at least all of its stated objectives.

I claim:

1. In combination with a vehicle having an elongated cargo supporting bed having two metal side rails, having upper and lower ends, running longitudinally along outer side areas of the bed and spaced laterally therefrom to define pocket areas therebetween, comprising:

a winch assembly including a substantially vertically disposed stem portion, having upper and lower ends; and a winch ratchet mechanism for winding one end of a tie-down strap therearound;

said stem portion having a hook member movably mounted thereon which is adapted to selectively releasably engage the lower end of one of said side rails, when said stem portion of said winch assembly is inserted downwardly into one of said pocket areas, at one side of the bed, to anchor said winch assembly to said one side of the bed;

and an anchor assembly secured to another side of the bed opposite to said winch assembly for selectively releasably receiving another end of the tie-down strap;

said anchor assembly including a substantially vertically disposed stem portion;

said stem portion of said anchor assembly having a hook member movably mounted thereon which is adapted to selectively releasably engage the lower end of one of said side rails at said another side of the bed when said stem portion of said anchor assembly is inserted downwardly into one of said pocket areas at said another side of the bed.

2. The combination of claim 1 wherein said anchor assembly further includes a pair of upstanding, horizontally spaced-apart plates mounted on an upper end of said stem portion of said anchor assembly, and a tie-down strap receiver mounted on and extending between said plates thereof.

3. The combination of claim 2 wherein said tie-down strap receiver on said anchor assembly is generally J-shaped.

4. The combination of claim 2 wherein said tie-down strap receiver on said anchor assembly includes a first tie-down portion, having upper and lower ends, secured to said spaced-apart plates and extending therebetween, and a generally U-shaped tie-down portion at the lower end of said first tie-down portion.

5. The combination of claim 4 wherein said first tie-down portion is inclined with respect to said spaced-apart plates so that it extends downwardly and outwardly from its said upper end.

6. The combination of claim 4 wherein said U-shaped tie-down portion has a notch formed therein.

7. The combination of claim 5 wherein said U-shaped tie-down portion has a notch formed therein.

8. In combination with a vehicle having an elongated cargo supporting bed having two metal side rails, having upper and lower ends, running longitudinally along outer side areas of the bed and spaced laterally therefrom to define pocket areas therebetween, comprising:

a winch assembly including a substantially vertically disposed stem portion, having upper and lower ends; and a winch ratchet mechanism for winding one end of a tie-down chain therearound;

said stem portion having a hook member movably mounted thereon which is adapted to selectively releasably engage the lower end of one of said side rails, when said stem portion of said winch assembly is inserted downwardly into one of said pocket areas, at one side of the bed, to anchor said winch assembly to said one side of the bed;

and an anchor assembly secured to another side of the bed opposite to said winch assembly for selectively releasably receiving another end of the tie-down chain;

said anchor assembly including a substantially vertically disposed stem portion;

said stem portion of said anchor assembly having a hook member movably mounted thereon which is adapted to selectively releasably engage the lower end of one of said side rails at said another of the bed when said stem portion of said anchor assembly is inserted downwardly into one of said pocket areas at said another side of the bed.

9. The combination of claim 8 wherein said anchor assembly further includes a pair of upstanding, horizontally spaced-apart plates mounted on an upper end of said stem portion of said anchor assembly, and a tie-down chain receiver mounted on and extending between said plates thereof.

10. The combination of claim 9 wherein said tie-down chain receiver on said anchor assembly is generally J-shaped.

11. The combination of claim 9 wherein said tie-down chain receiver on said anchor assembly includes a first tie-down portion, having upper and lower ends, secured to said spaced-apart plates and extending therebetween, and a generally U-shaped tie-down portion at the lower end of said first tie-down portion.

12. The combination of claim 11 wherein said first tie-down portion is inclined with respect to said spaced-apart plates so that it extends downwardly and outwardly from its said upper end.

13. The combination of claim 11 wherein said U-shaped tie-down portion has a notch formed therein.

14. The combination of claim 12 wherein said U-shaped tie-down portion has a notch formed therein.

* * * * *